United States Patent
Eom et al.

(10) Patent No.: US 11,440,807 B2
(45) Date of Patent: Sep. 13, 2022

(54) POSITIVE ELECTRODE ACTIVE MATERIAL FOR SECONDARY BATTERY, METHOD OF PREPARING THE SAME, AND LITHIUM SECONDARY BATTERY INCLUDING THE POSITIVE ELECTRODE ACTIVE MATERIAL

(71) Applicant: LG Chem, Ltd., Seoul (KR)

(72) Inventors: Jun Ho Eom, Daejeon (KR); Sung Ho Ban, Daejeon (KR); Hyeon Hui Baek, Daejeon (KR); Na Ri Park, Daejeon (KR)

(73) Assignee: LG Chem, Ltd.

( * ) Notice: Subject to any disclaimer, the term of this patent is extended or adjusted under 35 U.S.C. 154(b) by 97 days.

(21) Appl. No.: 16/757,214

(22) PCT Filed: Oct. 17, 2018

(86) PCT No.: PCT/KR2018/012301
§ 371 (c)(1),
(2) Date: Apr. 17, 2020

(87) PCT Pub. No.: WO2019/098541
PCT Pub. Date: May 23, 2019

(65) Prior Publication Data
US 2021/0078868 A1 Mar. 18, 2021

(30) Foreign Application Priority Data
Nov. 16, 2017 (KR) .................. 10-2017-0153282

(51) Int. Cl.
*C01B 35/12* (2006.01)
*C01G 53/00* (2006.01)

(52) U.S. Cl.
CPC .............. *C01B 35/12* (2013.01); *C01G 53/00* (2013.01)

(58) Field of Classification Search
None
See application file for complete search history.

(56) References Cited

U.S. PATENT DOCUMENTS

2011/0020708 A1  1/2011  Fujiki et al.
2011/0200880 A1  8/2011  Yu
(Continued)

FOREIGN PATENT DOCUMENTS

CN  101060173 A  10/2007
CN  106299352 A  1/2017
(Continued)

OTHER PUBLICATIONS

Search report from International Appilcation No. PCT/KR2018/012301, dated Apr. 12, 2019, pp. 1-2.
(Continued)

*Primary Examiner* — Daniel S Gatewood
(74) *Attorney, Agent, or Firm* — Lerner, David, Littenberg, Krumholz & Mentlik, LLP

(57) ABSTRACT

A method of preparing a positive electrode active material for a secondary battery is provided, which includes preparing a lithium composite transition metal oxide, and mixing the lithium composite transition metal oxide and a metal borate compound and performing a heat treatment to form a coating portion on surfaces of particles of the lithium composite transition metal oxide. The positive electrode active material prepared includes lithium composite transition metal oxide particles, and a coating portion formed on surfaces of the lithium composite transition metal oxide particles, wherein the coating portion includes lithium (Li)-metal borate.

7 Claims, 1 Drawing Sheet

(56) References Cited

U.S. PATENT DOCUMENTS

| | | |
|---|---|---|
| 2012/0231341 A1 | 9/2012 | Kim et al. |
| 2013/0295463 A1 | 11/2013 | Matsuda et al. |
| 2014/0045068 A1 | 2/2014 | Yamamoto et al. |
| 2014/0087270 A1* | 3/2014 | Yoshida .................. H01M 4/62 429/304 |
| 2014/0170494 A1 | 6/2014 | Paulsen et al. |
| 2015/0108397 A1 | 4/2015 | Takeoka et al. |
| 2016/0013476 A1* | 1/2016 | Oh ........................ H01M 4/131 429/223 |
| 2016/0351898 A1 | 12/2016 | Fang et al. |
| 2017/0012284 A1* | 1/2017 | Bugga .................. H01M 4/505 |
| 2017/0263920 A1 | 9/2017 | Choi et al. |
| 2018/0131006 A1 | 5/2018 | Kokubu et al. |

FOREIGN PATENT DOCUMENTS

| | | | |
|---|---|---|---|
| JP | 2011171113 A | | 9/2011 |
| JP | 2013137947 A | | 7/2013 |
| JP | 2017050204 A | | 3/2017 |
| KR | 20130135356 A | | 12/2013 |
| KR | 101651338 B1 | | 8/2016 |
| KR | 20170067085 A | * | 6/2017 |
| KR | 20170067085 A | | 6/2017 |
| KR | 20170075596 A | | 7/2017 |
| WO | 2017056364 A1 | | 4/2017 |

OTHER PUBLICATIONS

Search Report dated Dec. 10, 2021 from the Office Action for Chinese Application No. 201880066599.5 issued Dec. 27, 2021, 3 pages.

\* cited by examiner

POSITIVE ELECTRODE ACTIVE MATERIAL FOR SECONDARY BATTERY, METHOD OF PREPARING THE SAME, AND LITHIUM SECONDARY BATTERY INCLUDING THE POSITIVE ELECTRODE ACTIVE MATERIAL

CROSS-REFERENCE TO RELATED APPLICATIONS

The present application is a national stage entry under 35 U.S.C. § 371 of International Application No. PCT/KR2018/012301 filed on Oct. 17, 2018, which claims priority to Korean Patent Application No. 10-2017-0153282, filed on Nov. 16, 2017, in the Korean Intellectual Property Office, the disclosures of which are incorporated herein in their entirety by reference.

TECHNICAL FIELD

The present invention relates to a positive electrode active material for a secondary battery, a method of preparing the same, and a lithium secondary battery including the positive electrode active material.

BACKGROUND ART

Recently, with the rapid spread of electronic devices using batteries, such as mobile phones, notebook computers, and electric vehicles, demand for secondary batteries with relatively high capacity as well as small size and lightweight has been rapidly increased. Particularly, since a lithium secondary battery is lightweight and has high energy density, the lithium secondary battery is in the spotlight as a driving power source for portable devices. Accordingly, research and development efforts for improving the performance of the lithium secondary battery have been actively conducted.

In the lithium secondary battery in a state in which an organic electrolyte solution or a polymer electrolyte solution is filled between a positive electrode and a negative electrode which are respectively formed of active materials capable of intercalating and deintercalating lithium ions, electrical energy is produced by oxidation and reduction reactions when the lithium ions are intercalated/deintercalated into/from the positive electrode and the negative electrode.

Lithium cobalt oxide ($LiCoO_2$), lithium nickel oxide ($LiNiO_2$), lithium manganese oxide ($LiMnO_2$ or $LiMn_2O_4$, etc.), or a lithium iron phosphate compound ($LiFePO_4$) has been used as a positive electrode active material of the lithium secondary battery. Also, as a method to improve low thermal stability while maintaining excellent reversible capacity of the $LiNiO_2$, a lithium composite metal oxide (hereinafter, simply referred to as 'NCM-based lithium composite transition metal oxide' or 'NCA-based lithium composite transition metal oxide') in which a portion of nickel (Ni) is substituted with cobalt (Co) or manganese (Mn)/aluminum (Al), has been developed. However, capacity characteristics of conventionally developed NCM-based/NCA-based lithium composite transition metal oxides are not sufficiently high, and there is a risk of dissolution of metallic elements and the resulting battery characteristic degradation. Thus, for high energy density, studies have been made to increase a nickel (Ni) content in the NCM-based/NCA-based lithium oxides, but, with respect to a high-nickel (Ni) NCM-based/NCA-based lithium oxide, the generation of residual lithium by-products is increased, cycle characteristics are rapidly degraded during long-term use, and there are limitations such as low chemical stability and a swelling phenomenon due to the generation of gas caused by the decomposition of an electrolyte during charge and discharge.

Thus, research to improve life characteristics by coating a boron-based compound on the surface of a positive electrode active material of the high-nickel (Ni) NCM-based/NCA-based lithium oxide has been conducted, but the positive electrode active material thus prepared has limitations in that a phenomenon occurs in which boron is dissolved in an electrolyte solution, and, as a result, a degree of degradation of battery performance is increased at high temperatures.

DISCLOSURE OF THE INVENTION

Technical Problem

An aspect of the present invention provides a positive electrode active material for a secondary battery in which stability is secured, a swelling phenomenon is suppressed, and cycle characteristics at high temperatures are improved by suppressing a phenomenon in which boron is dissolved in an electrolyte solution when the positive electrode active material is coated with the boron.

Technical Solution

According to an aspect of the present invention, there is provided a method of preparing a positive electrode active material for a secondary battery which includes preparing a lithium composite transition metal oxide; and mixing the lithium composite transition metal oxide and a metal borate compound and performing a heat treatment to form a coating portion on surfaces of particles of the lithium composite transition metal oxide.

According to another aspect of the present invention, there is provided a positive electrode active material for a secondary battery including lithium composite transition metal oxide particles; and a coating portion formed on surfaces of the lithium composite transition metal oxide particles, wherein the coating portion includes lithium (Li)-metal borate.

According to another aspect of the present invention, there is provided a positive electrode and a lithium secondary battery which include the positive electrode active material.

Advantageous Effects

According to the present invention, since a positive electrode active material of a lithium composite transition metal oxide is coated with a metal borate compound, a coating portion of Li-metal borate may be formed on the surface of the positive electrode active material and a phenomenon, in which boron is dissolved in an electrolyte solution, may be suppressed.

A lithium secondary battery prepared by using the above-described positive electrode active material for a secondary battery according to the present invention may suppress a swelling phenomenon, may secure stability, and may improve cycle characteristics at high temperatures.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

MODE FOR CARRYING OUT THE INVENTION

Figure 1:
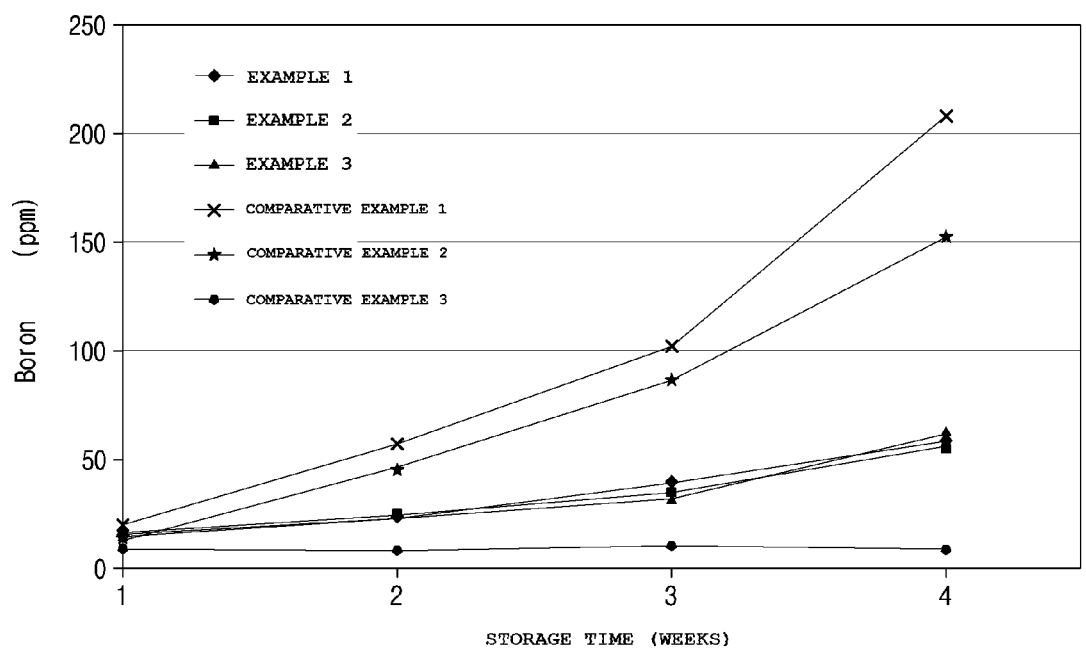
FIG. 1 is a graph in which an amount of boron dissolved according to storage time is measured for lithium secondary batteries respectively using positive electrode active materials prepared according to examples and comparative examples.

Hereinafter, the present invention will be described in more detail to allow for a clearer understanding of the present invention. In this case, it will be understood that words or terms used in the specification and claims shall not be interpreted as the meaning defined in commonly used dictionaries, and it will be further understood that the words or terms should be interpreted as having a meaning that is consistent with their meaning in the context of the relevant art and the technical idea of the invention, based on the principle that an inventor may properly define the meaning of the words or terms to best explain the invention.

A positive electrode active material for a secondary battery of the present invention is prepared by including: preparing a lithium composite transition metal oxide; and mixing the lithium composite transition metal oxide and a metal borate compound and performing a heat treatment to form a coating portion on surfaces of particles of the lithium composite transition metal oxide.

A method of preparing the positive electrode active material will be described in detail for each step.

First, a lithium composite transition metal oxide is prepared.

The lithium composite transition metal oxide may be a lithium composite transition metal oxide which includes nickel (Ni) and cobalt (Co) and includes at least one selected from the group consisting of manganese (Mn) and aluminum (Al). The lithium composite transition metal oxide may be a high-nickel (Ni) NCM-based/NCA-based lithium composite transition metal oxide in which an amount of nickel (Ni) in a total amount of transition metals is 60 mol % or more, and the amount of the nickel (Ni) in the total amount of the transition metals may more preferably be 80 mol % or more. In a case in which the amount of nickel (Ni) in the total amount of the transition metals is 60 mol % or more, high capacity may be secured. Thus, in a case in which the lithium composite transition metal oxide used in the present invention is a high-Ni-based lithium composite transition metal oxide in which the amount of nickel (Ni) is 60 mol % or more based on a total molar ratio of the transition metals, since residual lithium by-products are increased and it is more difficult to secure stability and capacity retention, it is more important to form a stable boron coating.

Specifically, the lithium composite transition metal oxide may be represented by Formula 2 below.

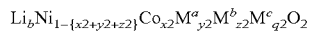   [Formula 2]

In Formula 2, $M^a$ is at least one element selected from the group consisting of Mn and Al, $M^b$ is at least one element selected from the group consisting of zirconium (Zr), boron (B), tungsten (W), magnesium (Mg), aluminum (Al), cerium (Ce), hafnium (Hf), tantalum (Ta), titanium (Ti), strontium (Sr), barium (Ba), fluorine (F), phosphorus (P), sulfur (S), and lanthanum (La), $M^c$ is at least one element selected from the group consisting of Al, Zr, Ti, Mg, Ta, niobium (Nb), molybdenum (Mo), W, and chromium (Cr), and $0.9 \leq b \leq 1.1$, $0 < x2 \leq 0.4$, $0 < y2 \leq 0.4$, $0 \leq z2 \leq 0.1$, $0 \leq q2 \leq 0.1$, and $0 < x2+y2+z2 \leq 0.4$.

In the lithium composite transition metal oxide of Formula 2, lithium (Li) may be included in an amount corresponding to b, that is, $0.9 \leq b \leq 1.1$. When b is less than 0.9, capacity may be reduced, and, when b is greater than 1.1, since particles are sintered in a sintering process, the preparation of the positive electrode active material may be difficult. The Li, for example, may be included in an amount satisfying $1.0 \leq b \leq 1.05$, in consideration of balance between a significant capacity characteristics improvement effect due to the control of the amount of the Li and sinterability during the preparation of the positive electrode active material.

In the lithium composite transition metal oxide of Formula 2, Ni may be included in an amount corresponding to $1-(x2+y2+z2)$, for example, $0.6 \leq 1-(x2+y2+z2) < 1$. If the amount of Ni in the lithium composite transition metal oxide of Formula 2 is 0.6 or more, since the amount of Ni, which is sufficient to contribute to charge and discharge, is secured, high capacity may be achieved. Preferably, Ni may be included in an amount satisfying $0.8 \leq 1-(x2+y2+z2) \leq 0.99$. As described above, with respect to the high-Ni-based lithium composite transition metal oxide in which nickel (Ni) is included in an amount of 60 mol % or more based on the total molar ratio of the transition metals in the lithium composite transition metal oxide used in the present invention, since the residual lithium by-products are increased and it is more difficult to secure the stability and capacity retention, it is more important to form a stable boron coating.

In the lithium composite transition metal oxide of Formula 2, cobalt (Co) may be included in an amount corresponding to x2, that is, $0 < x2 \leq 0.4$. In a case in which the amount of Co in the lithium composite transition metal oxide of Formula 2 is greater than 0.4, there is a concern that cost may increase. The Co may specifically be included in an amount satisfying $0.05 \leq x2 \leq 0.2$, in consideration of a significant capacity characteristics improvement effect due to the inclusion of the Co.

In the lithium composite transition metal oxide of Formula 2, $M^a$ may be Mn or Al, or Mn and Al, and these metallic elements may improve stability of the active material, and, as a result, may improve stability of the battery. In consideration of a life characteristics improvement effect, the $M^a$ may be included in an amount corresponding to y2, that is, $0 < y2 \leq 0.4$. If y2 in the lithium composite transition metal oxide of Formula 2 is greater than 0.4, there is a concern that output characteristics and capacity characteristics of the battery may be degraded, and the $M^a$ may specifically be included in an amount satisfying $0.05 \leq y2 \leq 0.2$.

In the lithium composite transition metal oxide of Formula 2, $M^b$ may be a doping element included in a crystal structure of the lithium composite transition metal oxide, wherein the $M^b$ may be included in an amount corresponding to z2, that is, $0 \leq z2 \leq 0.1$.

In the lithium composite transition metal oxide of Formula 2, metallic elements of $M^c$ may not be included in the lithium composite transition metal oxide structure, and a lithium composite transition metal oxide, in which the surface of the lithium composite transition metal oxide is doped with the $M^c$, may be prepared by a method of mixing and sintering a $M^c$ source together when a precursor and a lithium source are mixed and sintered, or a method of forming a lithium composite transition metal oxide and then separately adding and sintering the $M^c$ source. The $M^c$ may be included in an amount corresponding to q2 within a range in which characteristics of the positive electrode active material are not degraded, that is, $0 \leq q2 \leq 0.1$.

Next, the lithium composite transition metal oxide and a metal borate compound are mixed and heat-treated to form a coating portion on surfaces of particles of the lithium composite transition metal oxide.

The metal borate compound may be a borate compound including at least one metal ion selected from the group consisting of zinc (Zn), Zr, W, Mg, tin (Sn), Al, Ba, Ti, and vanadium (V), may more preferably be a Zn-borate compound, a Ti-borate compound, or an Al-borate compound, and may most preferably be a Zn-borate compound.

Typically, when boron coating is performed, boric acid such as $H_3BO_3$, boronic acid such as $C_6H_5B(OH)_2$, or boron oxide, such as $B_2O_3$, has been used, wherein, in a case in which coating is performed by using the above-described conventional boron sources, a lithium-borate (Li-borate)-based coating portion is formed, and the Li-borate-based coating portion thus formed has a limitation in that boron is dissolved in an electrolyte solution.

However, in the present invention, since coating is performed by using the metal borate compound as a boron source, a Li-metal borate coating portion is formed on the surface of the positive electrode active material, and it was confirmed that the Li-metal borate may suppress a phenomenon in which boron is dissolved in an electrolyte solution. Accordingly, a swelling phenomenon may be suppressed, stability may be secured, and cycle characteristics at high temperatures may be improved.

A conventional positive electrode active material coating method may be used as a coating method using the metal borate compound without limitation, and, for example, a coating method using dry mixing or wet mixing may be used.

With respect to the dry mixing coating method, after nanoparticles are formed by milling the metal borate compound, dry mixing may more preferably be performed. The milling method, for example, may be performed using a bead mill, a jet mill, or an air classifier mill (ACM), and may more preferably be milled using a bead mill. The metal borate compound may be milled to nanoparticles having a diameter of 50 nm to 400 nm and may then be dry mixed to perform coating.

A temperature during the heat treatment after the mixing may be in a range of 250° C. to 600° C., for example, 250° C. to 450° C.

Since the metal borate compound is mixed and then heat-treated as described above, a coating portion is formed on the surfaces of the particles of the lithium composite transition metal oxide. The coating portion formed by using the metal borate compound may include Li-metal borate.

The Li-metal borate included in the coating portion may be represented by the following Formula 1.

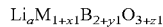　　　[Formula 1]

In Formula 1, M is at least one selected from the group consisting of Zn, Zr, W, Mg, Sn, Al, Ba, Ti, and V, and $0 < a \leq 1.5$, $-0.8 \leq x1 \leq 4$, $-1.8 \leq y1 \leq 4$, and $-2 \leq z1 \leq 10$.

The Li-metal borate thus formed may suppress dissolution of boron into the electrolyte solution.

Next, a positive electrode active material for a secondary battery according to the present invention will be described.

The positive electrode active material for a secondary battery of the present invention prepared by the above-described method includes lithium composite transition metal oxide particles; and a coating portion formed on surfaces of the lithium composite transition metal oxide particles, wherein the coating portion includes Li-metal borate.

Compositions and types of the lithium composite transition metal oxide and the Li-metal borate are equally used as those previously described in the method of preparing the positive electrode active material.

Specifically, the Li-metal borate included in the coating portion may be Li—Zn-borate, Li—Ti-borate, or Li—Al-borate, and may more preferably be Li—Zn-borate.

In the present invention, a Li-metal borate coating portion may be formed on the surfaces of the particles of the lithium composite transition metal oxide by using the metal borate compound. In a case in which coating is performed by using boric acid such as $H_3BO_3$, boronic acid such as $C_6H_5B(OH)_2$, or boron oxide, such as $B_2O_3$, as a boron source as in a typical case, since a Li-borate coating portion is formed, the dissolution of boron into the electrolyte solution occurs and battery performance at high temperatures are degraded, but, in the present invention, since coating is performed by using the metal borate compound, the Li-metal borate coating portion is formed, and the Li-metal borate may suppress the dissolution of boron into the electrolyte solution and may improve high-temperature cycle characteristics.

According to another embodiment of the present invention, provided are a positive electrode for a lithium secondary battery and a lithium secondary battery which include the above positive electrode active material.

Specifically, the positive electrode includes a positive electrode collector and a positive electrode active material layer which is disposed on the positive electrode collector and includes the positive electrode active material.

In the positive electrode, the positive electrode collector is not particularly limited as long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used. Also, the positive electrode collector may typically have a thickness of 3 μm to 500 μm, and microscopic irregularities may be formed on the surface of the collector to improve the adhesion of the positive electrode active material. The positive electrode collector, for example, may be used in various shapes such as that of a film, a sheet, a foil, a net, a porous body, a foam body, a non-woven fabric body, and the like.

Also, the positive electrode active material layer may include a conductive agent and a binder in addition to the above-described positive electrode active material.

In this case, the conductive agent is used to provide conductivity to the electrode, wherein any conductive agent may be used without particular limitation as long as it has suitable electron conductivity without causing adverse chemical changes in the battery. Specific examples of the conductive agent may be graphite such as natural graphite or artificial graphite; carbon based materials such as carbon black, acetylene black, Ketjen black, channel black, furnace black, lamp black, thermal black, and carbon fibers; powder or fibers of metal such as copper, nickel, aluminum, and silver; conductive whiskers such as zinc oxide whiskers and potassium titanate whiskers; conductive metal oxides such as titanium oxide; or conductive polymers such as polyphenylene derivatives, and any one thereof or a mixture of two or more thereof may be used. The conductive agent may be typically included in an amount of 1 wt % to 30 wt % based on a total weight of the positive electrode active material layer.

Furthermore, the binder improves the adhesion between the positive electrode active material particles and the adhesion between the positive electrode active material and the current collector. Specific examples of the binder may be polyvinylidene fluoride (PVDF), polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), a sulfonated EPDM, a styrene-butadiene rubber (SBR), a fluorine rubber, or various copolymers thereof, and any one thereof or a mixture of two or more thereof may be used. The binder may be included in an amount of 1 wt % to 30 wt % based on the total weight of the positive electrode active material layer.

The positive electrode may be prepared according to a typical method of preparing a positive electrode except that the above-described positive electrode active material is used. Specifically, a composition for forming a positive electrode active material layer, which includes the above-described positive electrode active material as well as selectively the binder and the conductive agent, is coated on the positive electrode collector, and the positive electrode may then be prepared by drying and rolling the coated positive electrode collector. In this case, types and amounts of the positive electrode active material, the binder, and the conductive are the same as those previously described.

The solvent may be a solvent normally used in the art. The solvent may include dimethyl sulfoxide (DMSO), isopropyl alcohol, N-methylpyrrolidone (NMP), acetone, or water, and any one thereof or a mixture of two or more thereof may be used. An amount of the solvent used may be sufficient if the solvent may dissolve or disperse the positive electrode active material, the conductive agent, and the binder in consideration of a coating thickness of a slurry and manufacturing yield, and may allow to have a viscosity that may provide excellent thickness uniformity during the subsequent coating for the preparation of the positive electrode.

Also, as another method, the positive electrode may be prepared by casting the composition for forming a positive electrode active material layer on a separate support and then laminating a film separated from the support on the positive electrode collector.

According to another embodiment of the present invention, an electrochemical device including the positive electrode is provided. The electrochemical device may specifically be a battery or a capacitor, and, for example, may be a lithium secondary battery.

The lithium secondary battery specifically includes a positive electrode, a negative electrode disposed to face the positive electrode, a separator disposed between the positive electrode and the negative electrode, and an electrolyte, wherein the positive electrode is as described above. Also, the lithium secondary battery may further selectively include a battery container accommodating an electrode assembly of the positive electrode, the negative electrode, and the separator, and a sealing member sealing the battery container.

In the lithium secondary battery, the negative electrode includes a negative electrode collector and a negative electrode active material layer disposed on the negative electrode collector.

The negative electrode collector is not particularly limited as long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, and an aluminum-cadmium alloy may be used. Also, the negative electrode collector may typically have a thickness of 3 μm to 500 μm, and, similar to the positive electrode collector, microscopic irregularities may be formed on the surface of the collector to improve the adhesion of a negative electrode active material. The negative electrode collector, for example, may be used in various shapes such as that of a film, a sheet, a foil, a net, a porous body, a foam body, a non-woven fabric body, and the like.

The negative electrode active material layer selectively includes a binder and a conductive agent in addition to the negative electrode active material. The negative electrode active material layer may be prepared by coating a composition for forming a negative electrode in the form of a slurry, which includes selectively the binder and the conductive agent as well as the negative electrode active material, on the negative electrode collector and drying the coated negative electrode collector, or may be prepared by casting the composition for forming a negative electrode on a separate support and then laminating a film separated from the support on the negative electrode collector.

A compound capable of reversibly intercalating and deintercalating lithium may be used as the negative electrode active material. Specific examples of the negative electrode active material may be a carbonaceous material such as artificial graphite, natural graphite, graphitized carbon fibers, and amorphous carbon; a metallic compound alloyable with lithium such as silicon (Si), aluminum (Al), tin (Sn), lead (Pb), zinc (Zn), bismuth (Bi), indium (In), magnesium (Mg), gallium (Ga), cadmium (Cd), a Si alloy, a Sn alloy, or an Al alloy; a metal oxide which may be doped and undoped with lithium such as $SiO_\alpha(0<\alpha<2)$, $SnO_2$, vanadium oxide, and lithium vanadium oxide; or a composite including the metallic compound and the carbonaceous material such as a Si—C composite or a Sn—C composite, and any one thereof or a mixture of two or more thereof may be used. Also, a metallic lithium thin film may be used as the negative electrode active material. Furthermore, both low crystalline carbon and high crystalline carbon may be used as the carbon material. Typical examples of the low crystalline carbon may be soft carbon and hard carbon, and typical examples of the high crystalline carbon may be irregular, planar, flaky, spherical, or fibrous natural graphite or artificial graphite, Kish graphite, pyrolytic carbon, mesophase pitch-based carbon fibers, meso-carbon microbeads, mesophase pitches, and high-temperature sintered carbon such as petroleum or coal tar pitch derived cokes.

Also, the binder and the conductive agent may be the same as those previously described in the positive electrode.

In the lithium secondary battery, the separator separates the negative electrode and the positive electrode and provides a movement path of lithium ions, wherein any separator may be used as the separator without particular limitation as long as it is typically used in a lithium secondary battery, and particularly, a separator having high moisture-retention ability for an electrolyte as well as low resistance to the transfer of electrolyte ions may be used. Specifically, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous nonwoven fabric, for example, a nonwoven fabric formed of high melting point glass fibers or polyethylene terephthalate fibers may be used. Furthermore, a coated separator including a ceramic component or a polymer material may be used to secure heat resistance or mechanical strength, and the separator having a single layer or multilayer structure may be selectively used.

Also, the electrolyte used in the present invention may include an organic liquid electrolyte, an inorganic liquid electrolyte, a solid polymer electrolyte, a gel-type polymer electrolyte, a solid inorganic electrolyte, or a molten-type inorganic electrolyte which may be used in the preparation of the lithium secondary battery, but the present invention is not limited thereto.

Specifically, the electrolyte may include an organic solvent and a lithium salt.

Any organic solvent may be used as the organic solvent without particular limitation so long as it may function as a medium through which ions involved in an electrochemical reaction of the battery may move. Specifically, an ester-based solvent such as methyl acetate, ethyl acetate, γ-butyrolactone, and ε-caprolactone; an ether-based solvent such as dibutyl ether or tetrahydrofuran; a ketone-based solvent such as cyclohexanone; an aromatic hydrocarbon-based solvent such as benzene and fluorobenzene; or a carbonate-based solvent such as dimethyl carbonate (DMC), diethyl carbonate (DEC), methylethyl carbonate (MEC), ethylmethyl carbonate (EMC), ethylene carbonate (EC), and propylene carbonate (PC); an alcohol-based solvent such as ethyl alcohol and isopropyl alcohol; nitriles such as R—CN (where R is a linear, branched, or cyclic C2-C20 hydrocarbon group and may include a double-bond aromatic ring or ether bond); amides such as dimethylformamide; dioxolanes such as 1,3-dioxolane; or sulfolanes may be used as the organic solvent. Among these solvents, the carbonate-based solvent may be used, and, for example, a mixture of a cyclic carbonate (e.g., ethylene carbonate or propylene carbonate) having high ionic conductivity and high dielectric constant, which may increase charge/discharge performance of the battery, and a low-viscosity linear carbonate-based compound (e.g., ethylmethyl carbonate, dimethyl carbonate, or diethyl carbonate) may be used. In this case, the performance of the electrolyte solution may be excellent when the cyclic carbonate and the chain carbonate are mixed in a volume ratio of about 1:1 to about 1:9.

The lithium salt may be used without particular limitation as long as it is a compound capable of providing lithium ions used in the lithium secondary battery. Specifically, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, or $LiB(C_2O_4)_2$ may be used as the lithium salt. The lithium salt may be used in a concentration range of 0.1 M to 2.0 M. In a case in which the concentration of the lithium salt is included within the above range, since the electrolyte may have appropriate conductivity and viscosity, excellent performance of the electrolyte may be obtained and lithium ions may effectively move.

In order to improve lifetime characteristics of the battery, suppress the reduction in battery capacity, and improve discharge capacity of the battery, at least one additive, for example, a halo-alkylene carbonate-based compound such as difluoroethylene carbonate, pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride, may be further added to the electrolyte in addition to the electrolyte components. In this case, the additive may be included in an amount of 0.1 wt % to 5 wt % based on a total weight of the electrolyte.

As described above, since the lithium secondary battery including the positive electrode active material according to the present invention stably exhibits excellent discharge capacity, output characteristics, and capacity retention, the lithium secondary battery is suitable for portable devices, such as mobile phones, notebook computers, and digital cameras, and electric cars such as hybrid electric vehicles (HEVs).

Thus, according to another embodiment of the present invention, a battery module including the lithium secondary battery as a unit cell and a battery pack including the battery module are provided.

The battery module or the battery pack may be used as a power source of at least one medium and large sized device of a power tool; electric cars including an electric vehicle (EV), a hybrid electric vehicle, and a plug-in hybrid electric vehicle (PHEV); or a power storage system.

Hereinafter, examples of the present invention will be described in detail in such a manner that it may easily be carried out by a person with ordinary skill in the art to which the present invention pertains. The invention may, however, be embodied in many different forms and should not be construed as being limited to the examples set forth herein.

Example 1

Particles ($D_{50}$=9.1 μm) of a $LiNi_{0.9}Co_{0.07}Mn_{0.03}O_2$ lithium composite transition metal oxide were formed and a washing process was performed. Thereafter, $ZnB_2O_7$ was milled using a bead mill to form nano-sized powder with a $D_{50}$ of 300 nm, and $LiNi_{0.9}Co_{0.07}Mn_{0.03}O_2$ and $ZnB_2O_7$ were solid-phase mixed in a weight ratio of 99.95:0.05 and then heated to 300° C. to prepare a positive electrode active material in which a coating portion including Li—Zn-borate (Li—Zn—B—O solid solution) was formed on a surface of a core particle including $LiNi_{0.9}Co_{0.07}Mn_{0.03}O_2$.

Example 2

A positive electrode active material, in which a coating portion including Li—Ti-borate (Li—Ti—B—O solid solution) was formed on a surface of a core particle including $LiNi_{0.9}Co_{0.07}Mn_{0.03}O_2$, was prepared in the same manner as in Example 1 except that $Ti_3B_4O_{12}$ was used instead of $ZnB_2O_7$.

Example 3

A positive electrode active material, in which a coating portion including Li—Al-borate (Li—Al—B—O solid solution) was formed on a surface of a core particle including $LiNi_{0.9}Co_{0.07}Mn_{0.03}O_2$, was prepared in the same manner as in Example 1 except that $AlBO_3$ was used instead of $ZnB_2O_7$.

Comparative Example 1

Particles ($D_{50}$=9.1 μm) of a $LiNi_{0.9}Co_{0.07}Mn_{0.03}O_2$ lithium composite transition metal oxide were formed and a washing process was performed. Thereafter, $LiNi_{0.9}Co_{0.07}Mn_{0.03}O_2$ and $H_3BO_3$ were solid-phase mixed in a weight ratio of 99.95:0.05 and then heated to 300° C. to prepare a positive electrode active material in which a coating portion including Li-borate (LiBO$_2$, Li$_2$B$_4$O$_7$, etc.) was formed on a surface of a core particle including LiNi$_{0.9}$Co$_{0.07}$Mn$_{0.03}$O$_2$.

Comparative Example 2

A positive electrode active material, in which a coating portion including Li-borate (LiBO$_2$, Li$_2$B$_4$O$_7$, etc.) was formed on a surface of a core particle including LiNi$_{0.9}$Co$_{0.07}$Mn$_{0.03}$O$_2$ was prepared in the same manner as in Comparative Example 1 except that B$_2$O$_3$ was used instead of H$_3$BO$_3$.

Comparative Example 3

A positive electrode active material was prepared by heat-treating a core particle including LiNi$_{0.9}$Co$_{0.07}$Mn$_{0.03}$O$_2$ at 300° C. without a boron compound coating treatment.

Preparation Example 1: Preparation of Lithium Secondary Battery

Each of the positive electrode active materials prepared in Examples 1 to 3 and Comparative Examples 1 to 3, a carbon black conductive agent, and a PVdF binder were mixed in an N-methylpyrrolidone solvent at a weight ratio of 96.5:1.5:2 to prepare a positive electrode material mixture (viscosity: 5,000 mPa·s), and one surface of an aluminum current collector was coated with the positive electrode material mixture, dried at 130° C., and then rolled to prepare a positive electrode. Also, lithium metal was used as a negative electrode.

Each lithium secondary battery was prepared by preparing an electrode assembly by disposing a porous polyethylene separator between the positive electrode and the negative electrode prepared as described above, disposing the electrode assembly in a case, and then injecting an electrolyte solution into the case. In this case, the electrolyte solution was prepared by dissolving 1.0 M lithium hexafluorophosphate (LiPF$_6$) in an organic solvent composed of ethylene carbonate/dimethyl carbonate/ethylmethyl carbonate (mixing volume ratio of EC/DMC/EMC=3/4/3).

Experimental Example 1: Evaluation of Amount of Boron Dissolved

After each of the lithium secondary battery coin half cells thus prepared was charged at a constant current (CC) of 0.2 C to 4.25 V, each coin half cell was disassembled, the positive electrode obtained was immersed in a container containing 1 mL of water (H$_2$O) and 15 mL of the electrolyte solution composed of ethylene carbonate/dimethyl carbonate/ethylmethyl carbonate (mixing volume ratio of EC/DMC/EMC=3/4/3) and then stored for 1 week, 2 weeks, 3 weeks, and 4 weeks in a thermostat at 60° C., and an amount of boron dissolved into the electrolyte solution was analyzed with an inductively coupled plasma emission spectrometer (ICP) (PerkinElmer OPTIMA 8000). The results thereof are presented in Table 1 and FIG. 1 below.

TABLE 1

|  | Amount of boron (B) dissolved after 1 week storage (ppm) | Amount of boron (B) dissolved after 2 weeks storage (ppm) | Amount of boron (B) dissolved after 3 weeks storage (ppm) | Amount of boron (B) dissolved after 4 weeks storage (ppm) |
|---|---|---|---|---|
| Example 1 | 15 | 23 | 39 | 58 |
| Example 2 | 16 | 25 | 34 | 56 |
| Example 3 | 16 | 24 | 32 | 62 |
| Comparative Example 1 | 20 | 57 | 102 | 207 |
| Comparative Example 2 | 12 | 45 | 85 | 150 |

Referring to Table 1 and FIG. 1, with respect to Examples 1 to 3 in which the Li-metal borate coating portion was formed by using the metal borate compound, amounts of boron (B) dissolved according to storage time were significantly reduced in comparison to those of Comparative Examples 1 and 2.

Experimental Example 2: High-temperature Cycle Characteristics Evaluation

Figure 2:
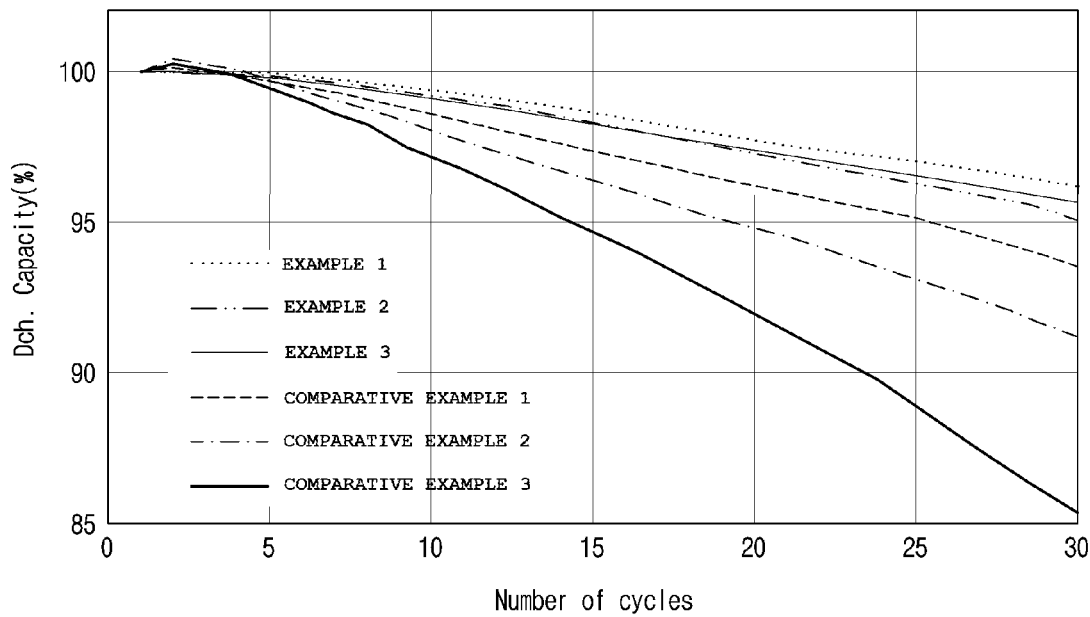
FIG. 2 is a graph in which cycle characteristics at a high temperature (45° C.) of the lithium secondary batteries respectively using the positive electrode active materials prepared according to the examples and the comparative examples are evaluated.

Capacity retention [%] was measured while 30 cycles of charge and discharge of each lithium secondary battery coin half cell thus prepared were performed under conditions including a charge end voltage of 4.25 V, a discharge end voltage of 2.5 V, and 0.3 C/0.3 C at 45° C., and the measurement results are illustrated in FIG. 2.

Referring to FIG. 2, with respect to Examples 1 to 3 in which the Li-metal borate coating portion was formed by using the metal borate compound, high-temperature cycle characteristics were improved in comparison to those of Comparative Examples 1 and 2. Also, it may be confirmed that the high-temperature cycle characteristics of Examples 1 to 3 were significantly improved in comparison to those of Comparative Example 3 which was not subjected to a boron coating treatment.

The invention claimed is:

1. A method of preparing a positive electrode active material for a secondary battery, comprising:
    preparing a lithium composite transition metal oxide; and
    mixing the lithium composite transition metal oxide and a metal borate compound and performing a heat treatment to form a coating portion comprising a lithium (Li)-metal borate on surfaces of particles of the lithium composite transition metal oxide,
    wherein the lithium composite transition metal oxide provides the source of Li for the Li-metal borate.

2. The method of claim 1, wherein the metal borate compound is a borate compound including at least one metal ion selected from the group consisting of zinc (Zn), zirconium (Zr), tungsten (W), magnesium (Mg), tin (Sn), aluminum (Al), barium (Ba), titanium (Ti), and vanadium (V).

3. The method of claim 1, wherein the metal borate compound is a Zn-borate compound.

4. The method of claim 1, wherein the lithium composite transition metal oxide comprises nickel (Ni), cobalt (Co) and at least one selected from the group consisting of manganese (Mn) and aluminum (Al), wherein an amount of nickel (Ni) in a total amount of transition metals in the lithium composite transition metal oxide is 60 mol % or more.

5. The method of claim 4, wherein the amount of the nickel (Ni) in the total amount of the transition metals in the lithium composite transition metal oxide is 80 mol % or more.

6. The method of claim 1, further comprising a coating method using dry mixing, wherein after nanoparticles are formed by milling the metal borate compound the dry mixing is performed.

7. The method of claim 1, wherein the lithium (Li)-metal borate is represented by Formula 1:

$$Li_aM_{1+x1}B_{2+y1}O_{3+z1} \quad \text{[Formula 1]}$$

wherein, in Formula 1, M is at least one selected from the group consisting of Zn, Zr, W, Mg, Sn, Al, Ba, Ti, and V, and $0 < a \leq 1.5$, $-0.8 \leq x1 \leq 4$, $-1.8 \leq y1 \leq 4$, and $-2 \leq z1 \leq 10$.

* * * * *